United States Patent [19]

Noguchi

[11] Patent Number: 4,800,276
[45] Date of Patent: * Jan. 24, 1989

[54] RADIATION IMAGE READ-OUT APPARATUS

[75] Inventor: Masaru Noguchi, Kaisei, Japan

[73] Assignee: Fuji Photo Film Co., Ltd., Minami-ashigara, Japan

[*] Notice: The portion of the term of this patent subsequent to Apr. 15, 2003 has been disclaimed.

[21] Appl. No.: 766,202

[22] Filed: Aug. 16, 1985

[30] Foreign Application Priority Data

Aug. 17, 1984 [JP] Japan ................................ 59-171227
Sep. 26, 1984 [JP] Japan ................................ 59-201171

[51] Int. Cl.$^4$ ............................................. G01T 1/105
[52] U.S. Cl. ............................... 250/327.2; 250/484.1
[58] Field of Search ........................... 250/484.1, 327.2

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 358/414 |
| 4,527,060 | 7/1985 | Suzaki et al. | 250/484.1 |
| 4,582,988 | 4/1986 | Aagano | 250/327.2 |

FOREIGN PATENT DOCUMENTS 56-11395 2/1981 Japan .

OTHER PUBLICATIONS

Formation of Optical Elements by Holography by G. Sincerbox, IBM Technical Discl. Bull vol. 10, No. 3, Aug. 67.

Primary Examiner—Janice A. Howell
Assistant Examiner—Richard Hanig
Attorney, Agent, or Firm—Fleit, Jacobson, Cohn & Price

[57] ABSTRACT

A radiation image read-out apparatus comprises devices for two-dimensionally scanning a stimulable phosphor sheet carrying a radiation image stored thereon by stimulating rays, and a light guide member having a light input face positioned above the stimulable phosphor sheet. A light shielding member having an aperture for passing light emitted by the stimulable phosphor sheet upon stimulation thereof is positioned between the stimulable phosphor sheet and the light guide member, and an optical system for converging the emitted light by a cylindrical lens and making it impinge upon the light guide member via the aperture is positioned between the stimulable phosphor sheet and the light shielding member. Or, a volume hologram for making the emitted light impinge upon the light guide member is positioned between the stimulable phosphor sheet and the light guide member.

5 Claims, 5 Drawing Sheets

F I G. 4
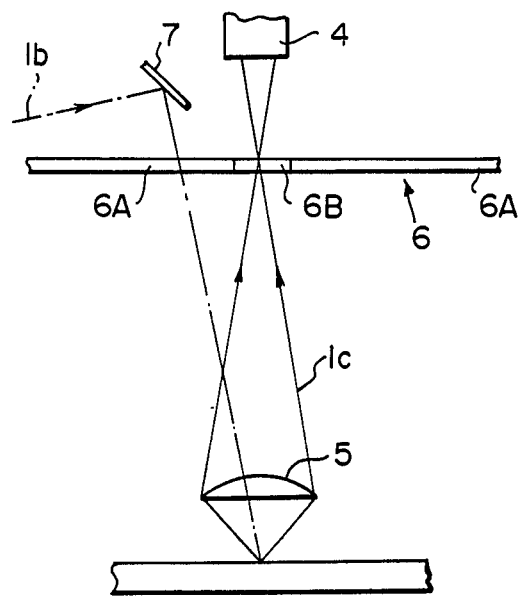
F I G. 5
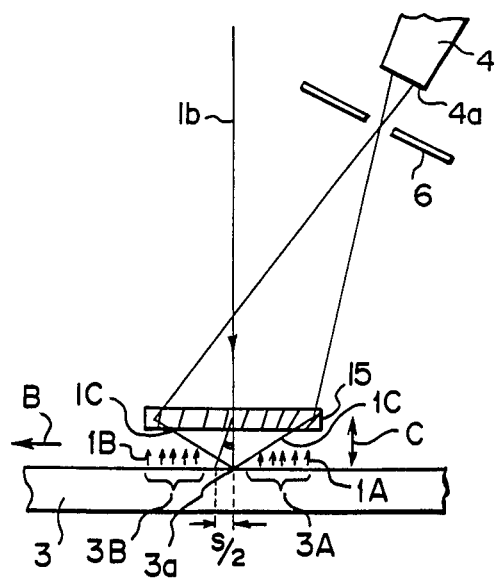

RADIATION IMAGE READ-OUT APPARATUS

BACKGROUND OF THE INVENTION

1. Field of the Invention

This invention relates to an apparatus for reading out a radiation image stored on a stimulable phosphor sheet. This invention particularly relates to a radiation image readout apparatus wherein light emitted by the stimulable phosphor sheet upon stimulation thereof in proportion to the radiation energy stored is detected accurately.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image having an improved quality, particularly a high diagnostic efficiency and accuracy.

FIG. 7 is a schematic view showing an example of a radiation image read-out apparatus employed in the aforesaid radiation image recording and reproducing system.

In the apparatus of FIG. 7, a laser beam 101a of a predetermined intensity is emitted as stimulating rays from a laser beam source 101 to a galvanometer mirror 102. The laser beam 101a is deflected by the galvanometer mirror 102 to form a laser beam 101b impinging upon a stimulable phosphor sheet 103 positioned below the galvanometer mirror 102 so that the sheet 103 is scanned by the laser beam 101b in the main scanning direction, i.e. in the width direction of the sheet 103 as indicated by the arrow A. While the laser beam 1b impinges upon the stimulable phosphor sheet 103, the sheet 103 is conveyed in the sub-scanning direction as indicated by the arrow B, for example, by an endless belt device 109. Therefore, scanning in the main scanning direction is repeated at an angle approximately normal to the sub-scanning direction, and the whole surface of the stimulable phosphor sheet 103 is two-dimensionally scanned by the laser beam 101b. As the stimulable phosphor sheet 103 is scanned by the laser beam 101b, the portion of the sheet 103 exposed to the laser beam 101b emits light having an intensity proportional to the stored radiation energy. The light emitted by the stimulable phosphor sheet 103 enters a transparent light guide member 104 from its light input face 104a positioned close to the sheet 3 in parallel to the main scanning line. The light guide member 104 has a flat-shaped front end portion 104b positioned close to the stimulable phosphor sheet 103 and is shaped gradually into a cylindrical shape towards the rear end side to form an approximately cylindrical rear end portion 104c which is closely contacted with a photomultiplier 105. The light emitted by the stimulable phosphor sheet 103 upon stimulation thereof and entering the light guide member 104 from its light input face 104a is guided inside of the light guide member 104 up to the rear end portion 104c, and received 15 by the photomultiplier 105. Thus the light emitted by the stimulable phosphor sheet 103 in proportion to the radiation energy stored therein is detected and converted into an electric image signal by the photomultiplier 105. The electric image signal thus obtained is sent to an image processing circuit 106 and processed therein. The electric image signal thus processed is then reproduced into a visible image and displayed, for example, on a CRT 107, or stored in a magnetic tape 108, or directly reproduced as a hard copy on a photographic material or the like.

In this manner, the radiation image stored on the stimulable phosphor sheet 103 is read out. However, since the light input face 104a of the light guide member 104 extends approximately over the entire width of the stimulable phosphor sheet 103 in parallel to the main scanning line thereon, all light emitted by the portions of the stimulable phosphor sheet 103 covered by the light input face 104a enters the light guide member 104 from the light input face 104a and is detected by the photomultiplier 105. That is, not only the light emitted by the portion of the stimulable phosphor sheet 103 upon which the laser beam 101b impinges at any given instant, in proportion to the radiation energy stored in that portion, but also the other light emitted as described below by the portions of the sheet 103 covered by the light input face 104a enters the light guide member 104 and is detected by the photomultiplier 105. The light other than the light emitted by the portion of the stimulable phosphor sheet 103 upon which the laser beam 101b impinges at any given instant in proportion to the radiation energy stored in that portion includes after-glows emitted by the stimulable phosphor sheet 103. The after-glows are divided into an instantaneous light emission after-glow and a stimulated light emission afterglow.

By "instantaneous light emission after-glow" is meant the after-glow of light instantaneously emitted by a stimulable phosphor sheet when the sheet is exposed to a radiation to have a radiation image stored in the sheet, the after-glow continuing to be emitted by the sheet while the light intensity decays after the exposure of the sheet to the radiation is ceased. The characteristics of the instantaneous light emission after-glow are generally as shown in FIG. 8, though they will differ depending on the type of the stimulable phosphor constituting the stimulable phosphor sheet. In the graph of FIG. 8, the ordinate represents the intensity of light emission and the abscissa represents time (t). As shown in FIG. 8, when the exposure of a stimulable phosphor sheet to a radiation is ceased after the sheet is exposed to the radiation for a period of Δt2 from a time t1 to a time t2, the intensity of light instantaneously emitted from the sheet at a light emission intensity A does not immediately decrease to zero, but instead an instantaneous light emission after-glow continues while the intensity thereof decreases along an exponential function curve the time constant of which increases gradually.

For example, decay of the light emission intensity of the instantaneous light emission after-glow is such that a light emission intensity B of the instantaneous light emission after-glow at a time t3 approximately 180 seconds after the exposure of a stimulable phosphor sheet to a radiation is ceased (i.e. t3−t2=180 seconds) is approximately $10^{-4}$ times the intensity of light emitted by the sheet when the sheet is exposed to stimulating rays.

Accordingly, in the case where a predetermined time elapses from when a stimulable phosphor sheet is exposed to a radiation passing through an object to have a radiation image stored in the sheet to when read out of the radiation image stored is conducted, the intensity of the instantaneous light emission after-glow decreases sufficiently and the effect of the after-glow becomes negligible in the read-out step. However, when read-out of the radiation image is conducted immediately after the radiation image is stored in the stimulable phosphor sheet, for example when a radiation image recording and read-out apparatus as described in U.S. patent application No. 600,689 wherein an image recording section and an image read-out section are installed integrally to record and read out many radiation images continuously and quickly is employed, the light emission intensity of the instantaneous light emission after-glow does not decay sufficiently before image read-out is conducted. As a result, the instantaneous light emission after-glow is detected together with the light emitted by the stimulable phosphor sheet in proportion to the radiation energy stored when the sheet is exposed to stimulating rays, and the effect of the instantaneous light emission after-glow on the electric image signals obtained thereby becomes large.

Further, the light emission by the stimulable phosphor sheet upon stimulation thereof by stimulating rays arises from a portion having a very small area upon which the stimulating rays impinge, whereas the instantaneous light emission after-glow is emitted by the whole surface of the stimulable phosphor sheet exposed to a radiation. Therefore, as the stimulable phosphor sheet 103 is scanned point by point by the laser beam 101b as shown in FIG. 7, the light emitted by a portion of the sheet 103 upon which the laser beam 101b impinges momentarily in proportion to the radiation energy stored in that portion and the instantaneous light emission after-glow emitted by all of the portions covered by the light input face 104a of the light guide member 104 simultaneously enter the light guide member 104 from the light input face 104a and are guided to the photomultiplier 105. In this case, since the area of the portions covered by the light input face 104a of the light guide member 104 is markedly larger than the area of the portion of the stimulable phosphor sheet 103 upon which the laser beam 101b impinges momentarily, the amount of the instantaneous light emission after-glow guided to the photomultiplier 105 becomes not negligible even though a predetermined time elapses after the exposure of the stimulable phosphor sheet 103 to a radiation is ceased and the intensity of the instantaneous light emission after-glow becomes negligibly low as compared with the intensity of the light emitted by the sheet 103 upon stimulation thereof.

By "stimulated light emission after-glow" is meant the after-glow of light emitted by a stimulable phosphor sheet carrying a radiation image stored therein when the sheet is exposed to stimulating rays (e.g. a laser beam) for reading out the radiation image, the afterglow continuing to be emitted by the sheet while the light intensity decays after the exposure of the sheet to the stimulating rays is ceased. The characteristics of the stimulated light emission afterglow are generally as shown in FIG. 9, though they will differ depending on the type of the stimulable phosphor constituting the stimulable phosphor sheet. In the graph of FIG. 9, the ordinate represents the intensity of light emission and the abscissa represents the time (t). As shown in FIG. 9, when the exposure of a stimulable phosphor sheet to stimulating rays is ceased after the sheet is exposed to the stimulating rays for a period of t5 from a time t4 to a time t5, the intensity of light emitted by the sheet upon stimulation thereof at a light emission intensity C does not immediately decrease to zero, but instead a stimulated light emission after-glow continues while the intensity thereof decreases along an exponential function curve with the time constant thereof increasing gradually. (That is, the light intensity decreases rapidly at the beginning and thereafter the rate of decrease in the light intensity becomes gradually lower.)

For example, decay of the light emission intensity of the stimulated light emission after-glow is such that the initial time constant is approximately one microsecond, i.e. the time t6−t5 required for the light emission intensity to become $1/e$ ($D/C = 1/e$) is approximately one microsecond. In general, since the speed of scanning (in the main scanning direction) of a stimulable phosphor sheet by stimulating rays by use of a galvanometer mirror is approximately 50 Hz, it takes approximately 20,000 microseconds for scanning one time. Accordingly, the intensity of the stimulated light emission afterglow decaying along an exponential function curve with the initial time constant of one microsecond becomes very low as compared with the intensity of the light emitted by the stimulable phosphor sheet upon stimulation thereof when the sheet is exposed to the stimulating rays. Thus the intensity of the stimulated light emission after-glow at each point of the stimulable phosphor sheet becomes almost negligible.

However, the light emission by the stimulable phosphor sheet upon stimulation thereof when the sheet is exposed to stimulation rays arises from a portion having a very small area upon which the stimulating rays impinge, whereas the stimulated light emission after-glow is emitted by the whole surface of the stimulable phosphor sheet scanned by the stimulating rays. Therefore, as the stimulable phosphor sheet 103 is scanned point by point by the laser beam 101b as shown in FIG. 7, the light emitted by a portion of the sheet 103 upon which the laser beam 101b impinges momentarily in proportion to the radiation energy stored in that portion and the stimulated light emission after-glow emitted by all of the portions covered by the light input face 104a of the light guide member 104 simultaneously enter the light guide member 104 from the light input face 104a and are guided to the photomultiplier 105. In this case, since the area of the portions covered by the light input face 104a of the light guide member 104 is markedly larger than the area of the portion of the stimulable phosphor sheet 103 which is momentarily exposed to the laser beam 101b and which emits light upon stimulation by the laser beam 101b, the amount of the stimulated light emission after-glow guided to the photomultiplier 105 becomes not negligible even though the intensity of the stimulated light emission after-glow becomes negligibly low as compared with the intensity of the light emitted by the sheet 103 upon stimulation thereof.

The after-glows detected together with the light emitted by the stimulable phosphor sheet upon stimulation thereof by stimulating rays as described above constitutes a noise component in the electric image signals obtained by the read-out of a radiation image and make it difficult to accurately read out the radiation image.

The instantaneous light emission after-glow presents a problem particularly when image read-out is carried out immediately after a stimulable phosphor sheet is exposed to a radiation to have the radiation image stored therein. On the other hand, the stimulated light emission after-glow presents a problem particularly when the scanning speed of stimulating rays on the stimulable phosphor sheet carrying the radiation image stored therein is increased.

The effects of the after-glows on the amount of light detected by image read-out will hereinbelow be described in more detail with reference to FIGS. 10A and 10B. FIG. 10A shows a stimulable phosphor sheet 103a carrying a radiation image of a human head stored therein. FIG. 10B shows a graph wherein the abscissa represents the scanning point along the line a on the stimulable phosphor sheet 103a of FIG. 10A and the ordinate represents the amount of light transmitted to a photomultiplier via a light guide member when the stimulable phosphor sheet 103a is scanned by stimulating rays (laser beam) along the line a. In FIG. 10B, the broken line 11 designates the amount of light actually transmitted to the photomultiplier, and the solid line 12 designates the amount of light emitted by the stimulable phosphor sheet 103a upon stimulation thereof when the sheet 103a is exposed to the stimulating rays. The chain line 13 designates the amount of after-glows (i.e. the sum of the instantaneous light emission after-glow and the stimulated light emission after-glow). That is, the sum of the amount 13 of the after-glows and the amount 12 of the light emitted by the stimulable phosphor sheet 103a upon stimulation thereof when the sheet 103a is exposed to the stimulating rays is equal to the light amount 11 transmitted to the photomultiplier. The light amount 11 is converted to an electric image signal by the photomultiplier and then logarithmically converted to reproduce a visible image by use of the logarithmically converted signal. In this case, the signal level obtained when the light amount 11 transmitted to the photomultiplier is converted to an electric image signal and then logarithmically converted is different from the signal level obtained when only the amount 12 of light emitted by the stimulable phosphor sheet 103a upon stimulation thereof by the stimulating rays is converted to an electric image signal and then logarithmically converted. Therefore, when a visible image is reproduced by use of the image signal obtained by converting the light amount 11 transmitted to the photomultiplier, the visible image thus reproduced becomes different from the correct image. That is, the visible image reproduced becomes incorrect or unsharp, and a very real problem arises with regard to the image quality, particularly diagnostic efficiency and accuracy.

Besides the after-glow problems described above, there often arises the problem that a part of the laser beam 101b is reflected by the surface of the stimulable phosphor sheet 103, and the reflected light is further reflected by the light input face 104a of the light guide member 104 to a non-scanned portion of the sheet 103 outside of the scanned portion thereof, thereby stimulating the stimulable phosphor at the non-scanned portion to emit light. When the light emitted by the non-scanned portion of the stimulable phosphor sheet 103 outside of the scanned portion thereof is detected by the photomultiplier, the light constitutes a noise component in the electric image signal obtained thereby, and the sharpness of the image reproduced by use of the electric image signal is deteriorated.

In order to eliminate the aforesaid problems, the applicant proposed in U.S. patent application No. 642,868 a radiation image read-out apparatus provided with a means for preventing the instantaneous light emission after-glow, the stimulated light emission after-glow, and the light emitted by a non-scanned portion of the stimulable phosphor sheet outside of the scanned portion thereof upon stimulation of the non-scanned portion by the reflected stimulating rays from entering the light guide member.

In the radiation image read-out apparatus, an aperture member provided with an aperture for allowing the stimulating rays to impinge upon the stimulable phosphor sheet for scanning it in the main scanning direction and for allowing the light emitted by the sheet upon stimulation thereof by the stimulating rays to enter the light input face of the light guide member, and light shielding sections positioned adjacent the aperture on the front side and the rear side thereof in the sub-scanning direction is positioned between the surface of the sheet and the light input face of the light guide member. However, since the light guide member is positioned close to the sheet in order to increase the efficiency with which the light emitted by the sheet is guided, it is not always possible for spatial reasons to position the aperture member between the sheet and the light input face of the light guide member. Further, in order to minimize the light guiding area on the sheet without cutting off the light emitted by the sheet, which should be detected, by the aperture member, the aperture of the aperture member must be made as small as the light guiding area and the aperture member must be positioned so that it almost contacts the sheet. However, it is not always possible to position the aperture member in this manner and to fabricate the aperture member having a very narrow aperture.

SUMMARY OF THE INVENTION

The primary object of the present invention is to provide an apparatus for reading out a radiation image, which minimizes adverse effects of the instantaneous light emission after-glow, the stimulated light emission after-glow, and the light emitted by a non-scanned portion of a stimulable phosphor sheet outside of the scanned portion thereof upon stimulation of the non-scanned portion by the reflected stimulating rays, on the image read-out and realizes accurate image read-out.

Another object of the present invention is to provide an apparatus for reading out a radiation image, which prevents the instantaneous light emission after-glow, the stimulated light emission after-glow, and the light emitted by a non-scanned portion of the stimulable phosphor sheet outside of the scanned portion thereof upon stimulation of the non-scanned portion by the reflected stimulating rays from entering the light guide member by use of a means easy to design and fabricate.

The present invention provides an apparatus for reading out a radiation image, which comprises:

(i) a main scanning means for scanning a stimulable phosphor sheet, which carries a radiation image stored therein, by stimulating rays in a main scanning direction to cause said stimulable phosphor sheet to emit light in proportion to the stored radiation energy, (ii) a sub-scanning means for scanning said stimulable phosphor sheet in a sub-scanning direction by moving said stimulable phosphor sheet with respect to said stimulating rays in a direction approximately normal to said main scanning direction, (iii) a light guide member provided with a light input face extending in parallel to the main scanning line in said main scanning direction so that light entering from said light input face is guided inside of said light guide member up to a light output face thereof, (iv) a photodetector closely contacted with said light output face of said light guide member, (v) a light shielding member positioned between the surface of said stimulable phosphor sheet and said light input face of said light guide member, and provided with an aperture extending in said main scanning direction, and (vi) an optical system for converging the light emitted by a scanned point on said stimulable phosphor sheet solely in said sub-scanning direction by a cylindrical lens positioned above said stimulable phosphor sheet, and making the light impinge upon said light input face of said light guide member via said aperture of said light shielding member.

The optical system is used to make the light emitted by the scanned point on the stimulable phosphor sheet impinge upon the cylindrical lens and to converge the light solely in the sub-scanning direction within the aperture of the light shielding member, and may be designed so that the light emitted by the scanned point passes along an arbitrary optical path before it is converged within the aperture, for example, by reflecting the light passing through the cylindrical lens by a mirror.

In the radiation image read-out apparatus of the present invention, since after-glows are prevented by the light shielding member from entering the light input face of the light guide member and only the light emitted by the stimulable phosphor sheet is guided to the light guide member via the aperture of the light shielding member, it is possible to minimize the adverse effects of after-glows on image readout. Also, since stimulating rays partially reflected by the surface of the stimulable phosphor sheet are prevented from entering the light input face of the light guide member or from being further reflected by the light input face towards the stimulable phosphor sheet, light emission at non-scanned portions does not arise, and it becomes possible to obtain a sharp visible image. Further, since the optical system including the cylindrical lens is positioned between the light shielding member and the stimulable phosphor sheet, the light shielding member and the light guide member need not be positioned close to the sheet, and it becomes easy to design the apparatus. When the image forming magnification of the cylindrical lens is increased, a sufficient after-glow shielding effect is obtained even with a large aperture width, and fabrication of the light shielding member is facilitated. Thus the present invention is very advantageous in practice.

The present invention also provides an apparatus for reading out a radiation image, which comprises the aforesaid components (i), (ii), (iii) and (iv), and (v) a volume hologram positioned between the surface of said stimulable phosphor sheet and said light input face of said light guide member for making the light emitted by a scanned point on said stimulable phosphor sheet impinge upon said light input face of said light guide member.

In the radiation image read-out apparatus of the present invention mentioned last, only the light which should be detected is guided to the light guide member and afterglows or the like emitted by non-scanned points on the stimulable phosphor sheet and impinging upon the volume hologram at angles of incidence different from the angle of incidence of the light which should be detected are prevented from entering the light guide member by use of the volume hologram recorded so that the light emitted by the scanned point on the sheet and impinging upon the volume hologram at a predetermined angle is diffracted to impinge upon the light input face of the light guide member.

In this radiation image read-out apparatus, since the volume hologram exhibiting angle selectivity is positioned between the surface of the stimulable phosphor sheet and the light guide member, it is possible to diffract only the light that should be detected and that impinges upon the volume hologram at a predetermined angle of incidence, and to converge the light towards the light input face of the light guide member. Therefore, it becomes possible to obtain a sharp visible image. Also, since the volume hologram can diffract the light, which is emitted by the stimulable phosphor sheet, in an arbitrary direction in accordance with the hologram recording, it is possible to determine the layout of the light guide member in accordance with the condition. This is very advantageous in design of the apparatus.

BRIEF DESCRIPTION OF THE DRAWINGS

FIGS. 4 and 5 are sectional views showing the configurations in the vicinities of the scanning sections in still further embodiments of the radiation image read-out apparatus in accordance with the present invention.

DESCRIPTION OF THE PREFERRED EMBODIMENTS

The present invention will hereinbelow be described in further detail with reference to the accompanying drawings.

Figure 1:
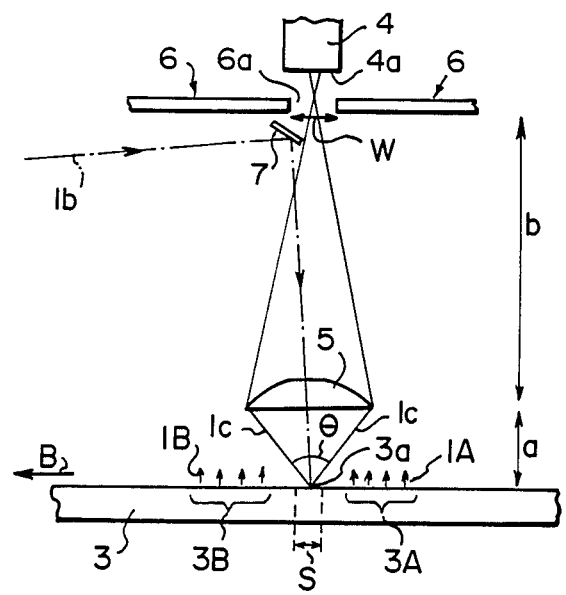
FIG. 1 is a sectional view showing the configuration in the vicinity of the scanning section in an embodiment of the radiation image read-out apparatus in accordance with the present invention.

FIG. 1 shows the configuration in the vicinity of the scanning section in an embodiment of the radiation image read-out apparatus in accordance with the present invention.

A stimulable phosphor sheet 3 carrying a radiation image stored therein is moved in the sub-scanning direction as indicated by the arrow B. The stimulable phosphor sheet 3 is scanned by a scanning laser beam 1b as stimulating rays in the main scanning direction along a scanning line 3a. As the stimulable phosphor sheet 3 is exposed to the scanning laser beam 1b, the portion exposed thereto emits light as indicated by 1c. Above the sheet 3 is positioned a cylindrical lens 5 for receiving the emitted light 1c within the range of a field angle θ and converging it solely in the sub-scanning direction. The emitted light 1c is converged by the cylindrical lens 5 at a position above the cylindrical lens 5 and impinges upon a light input face 4a of a light guide member 4 positioned above the converging position.

Figure 2:
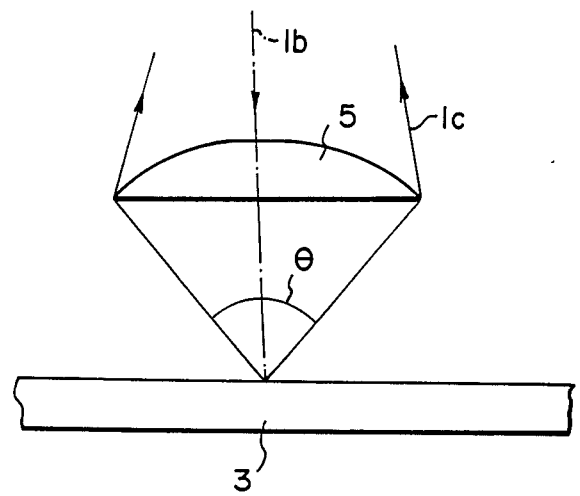
FIG. 2 is an enlarged view showing the shape of the cylindrical lens in the embodiment of FIG. 1, FIGS. 3A and 3B and sectional views showing the optical systems at the scanning sections in further embodiments of the radiation image read-out apparatus in accordance with the present invention.

On the stimulable phosphor sheet 3, a portion 3A which is scanned next emits an after-glow 1A of instantaneous light emission arising when the sheet 3 is exposed to a radiation to have the radiation image stored therein. A portion 3B scanned previously emits an afterglow 1B of stimulated light emission. In order to prevent the afterglows from entering the light guide member 4, a light shielding member 6 is positioned below the light guide member 4. The light shielding member 6 has an aperture 6a extending in the main scanning direction at the center of the member 6 over a length not smaller than the main scanning width, and is positioned so that the converging position of the emitted light 1c by the cylindrical lens 5 is within the aperture 6a. The width W of the aperture 6a is defined by S×M where M denotes the image forming magnification of the cylindrical lens represented by b/a wherein a designates the distance between the scanned position and the cylindrical lens 5 and b designates the distance between the cylindrical lens 5 and the light converging position, and S denotes the width of the stimulable phosphor sheet portion emitting the light 1c which should be detected. Therefore, when the image forming magnification M is increased, the width W of the aperture 6a may be increased even though the width S of the light guiding area is decreased, and formation of the aperture 6a becomes easy. In order to completely receive the light emitted by the light guiding area on the sheet 3, the cylindrical lens 5 should be positioned as close to the sheet 3 as possible (the field angle θ should be increased). Therefore, the focal length of the cylindrical lens 5 should preferably be as small as possible. For this purpose, a circular rod lens or a semicircular rod lens exhibiting a comparatively small focal length may be used. In this embodiment, the scanning laser beam 1b is scanned on the sheet 3 via the cylindrical lens 5 after being reflected by a reflection mirror 7 positioned below the light shielding member 6. Since the cylindrical lens 5 need not exhibit the lens action for the scanning laser beam 1b, the portion of the cylindrical lens 5 upon which the scanning laser beam 1b impinges may be formed flat as shown in FIG. 2.

Figure 3A:
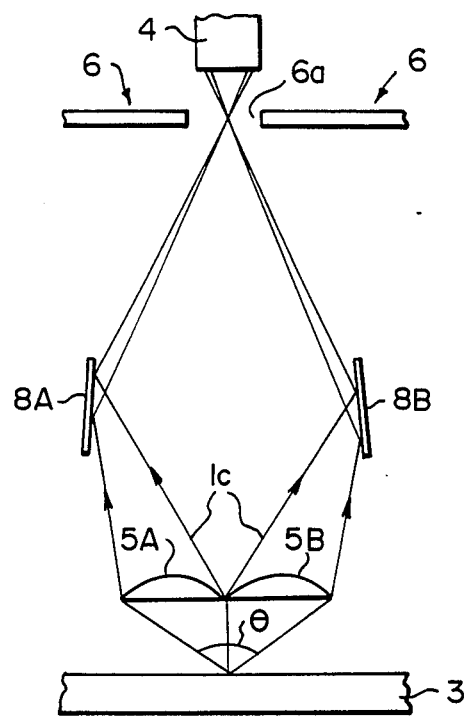
Figure 3B:
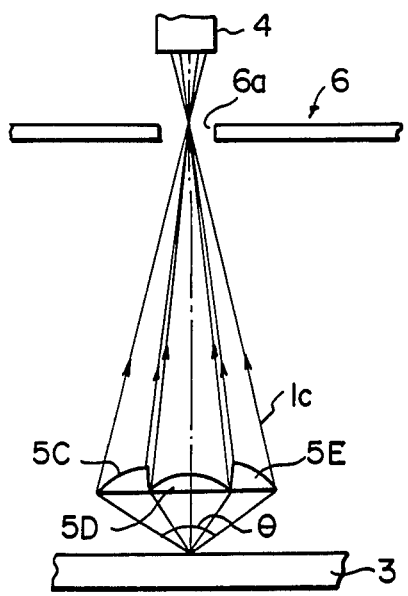

FIGS. 3A and 3B show the optical systems for guiding the light 1c emitted by the sheet 3 to the light guide member 4 in further embodiments of the radiation image readout apparatus in accordance with the present invention.

In FIG. 3A, cylindrical lenses 5A and 5B having equal focal lengths are positioned adjacent to each other in the sub-scanning direction. This configuration is advantageous in the case where a sufficiently large field angle θ cannot be obtained with a single cylindrical lens. the light 1c passing through the cylindrical lens 5A and the light 1c passing through the cylindrical lens 5B are respectively reflected by reflection mirrors 8A and 8B positioned on the corresponding optical paths and are guided to converge at the same position within the aperture 6a of the light shielding member 6. The embodiment shown in FIG. 3B is also advantageous for increasing the field angle θ. In this embodiment, cylindrical lenses 5C, 5D and 5E having the same axis are positioned adjacent to each other for converging the light 1c passing therethrough at the position within the aperture 6a.

FIG. 4 shows a further embodiment of the radiation image read-out apparatus in accordance with the present invention. In this embodiment, the scanning laser beam 1b is emitted from above the light shielding member 6. In this case, light shielding portions 6A of the light shielding member 6 are provided with a dichroic film for transmitting light having a wavelength within the wavelength distribution of the scanning laser beam 1b and cutting off light having a wavelength within the wavelength distributions of the light emitted by the stimulable phosphor sheet and the after-glows. An aperture portion 6B of the light shielding member 6 is provided with a transparent film or a dichroic film for transmitting light having a wavelength within the wavelength distribution of the light emitted by the stimulable phosphor sheet and cutting off light having a wavelength within the wavelength distribution of the scanning laser beam. Thus it is made possible to emit the scanning laser beam 1b from above the light shielding member 6 while the after-glows are shielded.

FIG. 5 shows a still further embodiment of the radiation image read-out apparatus in accordance with the present invention. The light 1c emitted by the stimulable phosphor sheet 3 has a wavelength of approximately 390 nm, and the scanning laser beam 1b has a wavelength (e.g. 633 nm, 780 nm or 830 nm) different from that of the emitted light 1c. Above the sheet 3 is positioned a phase type volume hologram 15 for diffracting and converging the light, which has a predetermined wavelength and impinges upon the hologram 15 at a predetermined angle of incidence, in a predetermined direction at a high efficiency (e.g. of 80% or more). The volume hologram 15 extends in the main scanning direction. The light 1c emitted by the sheet 3 and impinging upon the volume hologram 15 is diffracted by the volume hologram 15 and converged in front of the light input face 4a of the light guide member 4. Since the scanning laser beam 1b has a wavelength different from that of the emitted light 1c, the phase type volume hologram 15 is almost permeable to the scanning laser beam 1b. The volume hologram 15 has a thickness of, for example, 35 μm, and diffracts the light incident thereupon at an angle within the range of ±5° with respect to a predetermined angle of incidence in the aforesaid direction. Therefore, the volume hologram 15 may be positioned so that the distance c between the surface of the sheet 3 and the volume hologram 15 is equal to S/2/tan 5° where S denotes the width of the sheet portion emitting the light 1c which should be detected. Also, when the thickness of the volume hologram 15 is adjusted to 110 μm, the range of incident angle of the light which can be diffracted becomes ±2° with respect to the predetermined angle of incidence. Thus, by changing the thickness of the volume hologram 15, it is possible to change the range of light diffracted.

Figure 6:
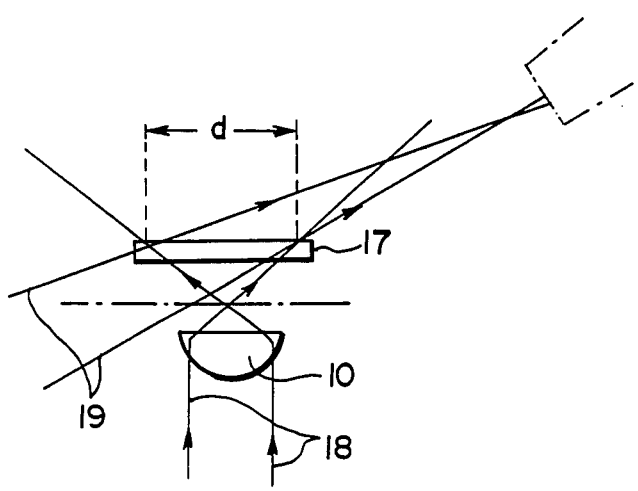
FIG. 6 is a schematic view showing the method of recording on a recording material for obtaining the volume hologram in FIG. 5.

As shown in FIG. 6, recording on a hologram recording material for obtaining a desirable volume hologram may be conducted by utilizing interference between a first laser beam 18 and a second laser beam 19 having the same wavelength as that of the light, which is emitted by the stimulable phosphor sheet and which should be diffracted, on a medium 17 made of dichromated gelatin, silver halide, $LiNbO_3$ or the like. Specifically, the first laser beam 18 comprising parallel rays impinges upon a cylindrical lens 10 and is converged thereby into a linear light source. Then, it diverges and impinges upon the medium 17 in the range as indicated by the arrow d. On the other hand, the second laser beam 19 impinges upon the medium 17 within the same range (indicated by the arrow d) as that of the first laser beam 18, passes through the medium 17, and is converged at a predetermined position. By the interference between the two laser beams on the medium, the volume hologram for diffracting the light emitted by a scanned position corresponding to the converging position of the first laser beam 18 and for converging the light at the converging position of the second laser beam 19 is obtained. Therefore, by using the volume hologram formed by conducting the recording on the medium by changing the angles of incidence of the two laser beams or the like, it becomes possible to converge the light, which is emitted by an arbitrary position, at an arbitrary position. When the linear light source extending over the length equal to the scanning line length cannot be obtained with a single cylindrical lens in the recording on the volume hologram medium, the linear light source may be used repeatedly until the length equal to the scanning line length is attained. Though the wavelengths of the two laser beams should preferably be equal to the wavelength (390 nm) of the light emitted by the stimulable phosphor sheet, laser beams having such wavelengths are not available presently. Therefore, the recording may be conducted by use of He-Cd lasers emitting laser beams having a wavelength of 442 nm which is close to 390 nm, and the directions of the two laser beams may be adjusted in accordance with the difference in the wavelength to obtain a desirable volume hologram.

Reverting to FIG. 5, the emitted light 1c is diffracted and converged by the volume hologram 15 and then impinges upon the light input face 4a of the light guide member 4 positioned just above the converging position. Below the light guide member 4 is positioned the light shielding member 6 having the aperture extending in the main scanning direction.

Since the instantaneous light emission after-glow 1A and the stimulated light emission after-glow 1B little impinge upon the volume hologram 15 at an angle of incidence for diffraction, they are little diffracted by the volume hologram 15 and little impinge upon the light guide member 4. Further, since the light shielding member 6 intercepts a part of the after-glows advancing towards the light guide member 4 regardless of the diffraction by the volume hologram 15, there is no risk of the after-glows or the like impinging upon the light guide member 4. The light shielding member 6 may be omitted when the adverse effects of the after-glows can be decreased sufficiently by the action of the volume hologram 15 alone. In this embodiment, since the phase type volume hologram is used, the scanning laser beam 1b is emitted from above the volume hologram 15, passed therethrough, and made to impinge upon the sheet 3. However, it is also possible to use an amplitude type volume hologram. In this case, the scanning laser beam 1b may be emitted obliquely from an upper section so that it does not pass through the volume hologram, and may have a wavelength equal to that of the light emitted by the stimulable phosphor sheet.

Figure 7:
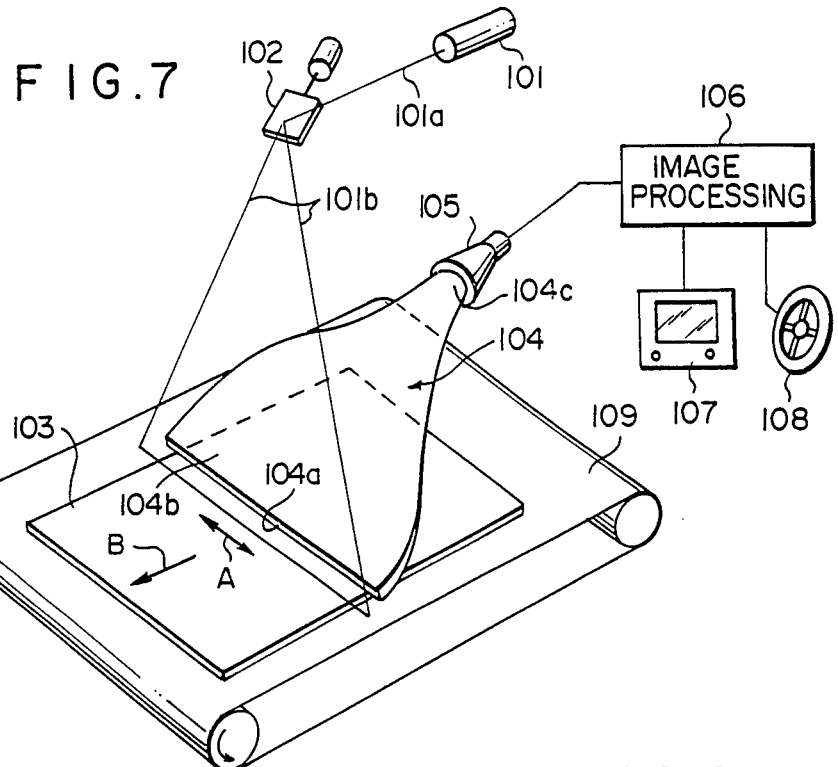
FIG. 7 is a schematic view showing an example of the conventional radiation image read-out apparatus.
Figure 8:
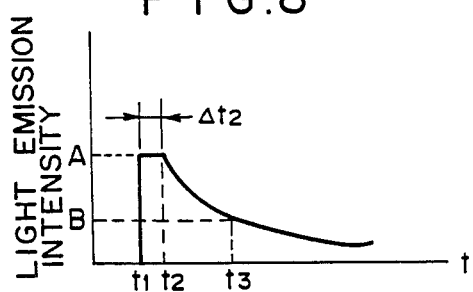
FIG. 8 is a graph showing the decay characteristics of an instantaneous light emission after-grow.
Figure 9:
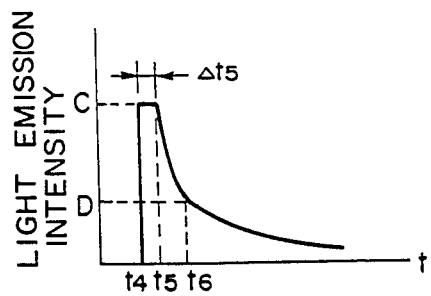
FIG. 9 is a graph showing the decay characteristics of a stimulated light emission after-grow.
Figure 10A:
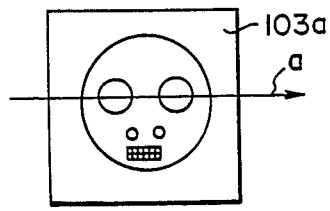
FIG. 10A is a schematic view showing a stimulable phosphor sheet carrying a radiation image of a human head stored therein.
Figure 10B:
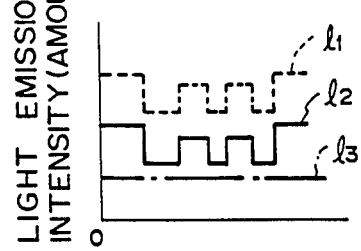
FIG. 10B is a graph showing the light emission intensity transmitted to a photomultiplier via a light guide member when the stimulable phosphor sheet shown in FIG. 10A is scanned by stimulating rays.

The shape of the light guide member is not limited to the shape shown in FIG. 7, and may be such that the light output face is divided into a plurality of sections which are respectively connected with photodetectors such as photomultipliers as described, for example, in U.S. patent application No. 676,998.

I claim:

1. An apparatus for reading out a radiation image, which comprises:
   (i) a main scanning means for scanning a stimulable phosphor sheet, which carries a radiation image stored therein, by stimulating rays in a main scanning direction to cause said stimulable phosphor sheet to emit light in proportion to the stored radiation energy,
   (ii) a sub-scanning means for scanning said stimulable phosphor sheet in a sub-scanning direction by moving said stimulable phosphor sheet with respect to said stimulating rays in a direction approximately normal to said main scanning direction,
   (iii) a light guide member provided with a light input face extending in parallel to the main scanning line in said main scanning direction so that light entering from said light input face is guided inside of said light guide member up to a light output face thereof,
   (iv) a photodetector closely contacted with said light output face of said light guide member,
   (v) a light shielding member positioned between the surface of said stimulable phosphor sheet and said light input face of said light guide member, and provided with an aperture extending in said main scanning direction, and
   (vi) an optical system for converging the light emitted by a scanned point on said stimulable phosphor sheet solely in said sub-scanning direction by a cylindrical lens positioned above said stimulable phosphor sheet, and making the light impinge upon said light input face of said light guide member via said aperture of said light shielding member.

2. An apparatus as defined in claim 1 wherein said optical system comprises two cylindrical lenses positioned adjacent to each other in the sub-scanning direction, and two reflection mirrors positioned on optical paths of the light emitted by said scanned point and passing through said cylindrical lenses.

3. An apparatus as defined in claim 1 wherein said optical system comprises three cylindrical lenses positioned adjacent to each other in the sub-scanning direction.

4. An apparatus as defined in claim 1 wherein light shielding portions of said light shielding member are provided with a dichroic film for transmitting light having a wavelength within the wavelength distribution of said stimulating rays and cutting off light having a wavelength within the wavelength distribution of the light emitted by said stimulable phosphor sheet and after-glows, and said aperture is provided with a transparent film or a dichroic film for transmitting light having a wavelength within the wavelength distribution of the light emitted by said stimulable phosphor sheet and cutting off light having a wavelength within the wavelength distribution of said stimulating rays.

5. An apparatus for reading out a radiation image, which comprises:
   (i) a main scanning means for scanning a stimulable phosphor sheet, which carries a radiation image stored therein, by stimulating rays in a main scanning direction to cause said stimulable phosphor sheet to emit light in proportion to the stored radiation energy,
   (ii) a sub-scanning means for scanning said stimulable phosphor sheet in a sub-scanning direction by moving said stimulable phosphor sheet with respect to said stimulating rays in a direction approximately normal to said main scanning direction,
   (iii) a light guide member provided with a light input face extending in parallel to the main scanning line in said main scanning direction so that light entering from said light input face is guided inside of said light guide member up to a light output face thereof,
   (iv) a photodetector closely contacted with said light output face of said light guide member,
   (v) a volume hologram positioned between the surface of said stimulable phosphor sheet and said light input face of said light guide member for making the light emitted by a scanned point on said stimulable phosphor sheet impinge upon said light input face of said light guide member, and
   (vi) a light shielding member positioned between said volume hologram and light input face of said light guide member and having an aperture extending in the main scanning direction.

* * * * *